(12) United States Patent
Manclossi et al.

(10) Patent No.: US 10,114,143 B2
(45) Date of Patent: Oct. 30, 2018

(54) DOWNHOLE TOOL AND METHOD FOR IMAGING A WELLBORE

(71) Applicant: Schlumberger Technology Corporation, Houston, TX (US)

(72) Inventors: Mauro Manclossi, Clamart (FR); Laurent Laval, Clamart (FR); Christian Stoller, Sugar Land, TX (US); Francoise Allioli, Paris (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/375,569

(22) Filed: Dec. 12, 2016

(65) Prior Publication Data

US 2017/0176632 A1  Jun. 22, 2017

Related U.S. Application Data

(60) Provisional application No. 62/269,154, filed on Dec. 18, 2015.

(30) Foreign Application Priority Data

Dec. 18, 2015  (EP) ..................... 15290323

(51) Int. Cl.
*G01V 5/06* (2006.01)
*G01V 5/10* (2006.01)
*E21B 47/00* (2012.01)
*E21B 47/10* (2012.01)

(52) U.S. Cl.
CPC ............... *G01V 5/06* (2013.01); *E21B 47/00* (2013.01); *E21B 47/10* (2013.01); *G01V 5/10* (2013.01)

(58) Field of Classification Search
CPC ........... E21B 47/00; E21B 47/10; G01V 5/06; G01V 5/10
See application file for complete search history.

(56) References Cited

U.S. PATENT DOCUMENTS

RE36,012 E  12/1998  Loomis et al.

FOREIGN PATENT DOCUMENTS

EP  2887104 A1  6/2015

OTHER PUBLICATIONS

Extended Search Report issued in the related EP application 15290323.3, dated May 30, 2016 (7 pages).
J.P. Cussonneau et al. Test of the spatial resolution of MICROMEGAS detectors—Nucl. Instr. And Meth. In Phys. Res. A419 (1998) 452-459.

(Continued)

*Primary Examiner* — Mark R Gaworecki

(57) ABSTRACT

This disclosure is related to a downhole tool to be lowered into a wellbore, having a longitudinal axis and an outer surface, the tool including:
  a particle detection assembly having at least one particle detector for detecting at least a predetermined type of particles, wherein the particle detectors of the assembly are each wrapped around at least one detecting portion forming an angular portion of the tool azimuthal plane perpendicular to the longitudinal axis of the tool so that the detection assembly substantially forms a ring,
  at least a window transparent to the particle type and extending between the outer surface and the particle detection assembly.

14 Claims, 5 Drawing Sheets

(56) References Cited

OTHER PUBLICATIONS

GAO, Managing Critical Isotopes: Weaknesses in DOE's Management of Helium-3 Delayed the Federal Response to a critical supply shortage, GAO-11-472 (Washington D.C.: May 12, 2011)—29 pages.

Kouzes R., J. Ely, and D. Stromswold. 2010a, Baron-lined Straw Tube Detector Test. PNNL-19600. Richland, Wash.: Pacific Northwest National Laboratory. Aug. 7—20 pages.

DOWNHOLE TOOL AND METHOD FOR IMAGING A WELLBORE

CROSS-REFERENCE TO RELATED APPLICATIONS

The present invention claims the benefits of European Patent Application No. 15290323.3, filed on Dec. 18, 2015, and U.S. Provisional Application 62/269,154, filed on Dec. 18, 2015, the entire content of which are hereby incorporated by reference into the current application.

BACKGROUND

The disclosure is related to a downhole tool for logging a wellbore and in particular to a downhole tool containing a particle detector for detection of particles such as neutrons or gamma-ray or x-ray photons.

Particle detection, such as the detection of neutrons, is used for characterizing the formation around the borehole during exploration, development and production. Measurements may be acquired while drilling or after the well has been drilled, using for instance a wireline tool. Such tools are described in patent applications such as US Re. 36,012.

SUMMARY

The disclosure relates to a downhole tool to be lowered into a wellbore, including a particle detection assembly with particle detectors for detecting a predetermined type of particles and a window transparent to the particle type and extending between the outer surface of the tool and the particle detection assembly. The particle detectors of the assembly are each wrapped around one detecting portion forming an angular portion of the tool in the azimuthal plane of the tool so that the detection assembly forms a ring.

For clarity, the azimuthal plane is defined as perpendicular to the longitudinal axis of the tool.

Such a tool enables getting an azimuthal image of at least a parameter relative to the wellbore and to increase the amount of data obtained relative to the wellbore, therefore enhancing the analysis of the formation and the wellbore.

The disclosure also relates to a method for imaging a parameter relative to a wellbore comprising:
  Conveying a downhole tool according to the disclosure in the wellbore,
  Receiving detection signals representative of a detection of a predetermined type of particles from the particle detection assembly,
  Processing the detection signals in order to obtain an azimuthal image of the parameter.

For clarity, an azimuthal image is defined as an image in the azimuthal plane, i.e. at a plurality of angular positions relative to the axis of the tool in the azimuthal plane.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, some features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
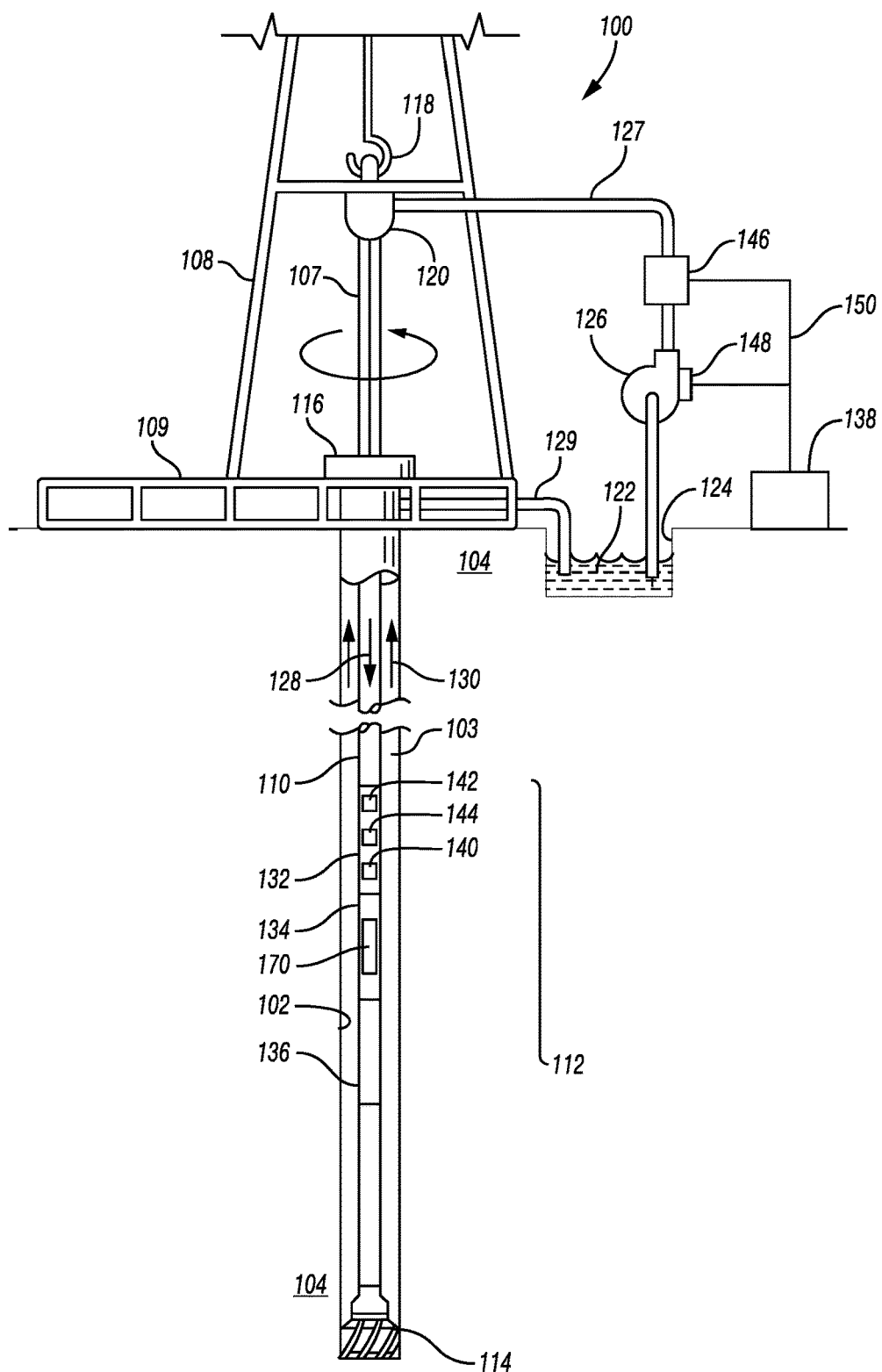
FIG. 1 is an exemplary embodiment of a wellsite system comprising a downhole tool according to one or more aspects according to the disclosure

FIG. 1 is a schematic view of at least a portion of an example implementation of a wellsite system 100 according to one or more aspects of the present disclosure. The wellsite system 100 depicted in FIG. 1 represents an example environment in which one or more aspects described below may be implemented. It is also noted that although the wellsite system 100 is depicted in FIG. 1 as an onshore implementation, it is understood that the aspects described below are also generally applicable to offshore implementations.

The wellsite system 100 is depicted in FIG. 1 in relation to a wellbore 102 formed in a subterranean formation 104 by rotary and/or directional drilling. The wellsite system 100 includes a platform, rig, derrick, and/or other wellsite structure 108 positioned over the wellbore 102. A BHA 112 is suspended from the wellsite structure 108 within the wellbore 102 via conveyor 110. The conveyor 110 may comprise drill pipe, wired drill pipe (WDP), tough logging condition (TLC) pipe, coiled tubing, and/or other means of conveying the BHA 112 within the wellbore 102.

The BHA 112 may include or be coupled to a drill bit 114 at its lower end. Rotation of the drill bit 114 advances the BHA 112 into the formation 104 to form the wellbore 102. For example, a Kelly 107 connected to the upper end of the conveyor 110 may be rotated by a rotary table 116 on the rig floor 109. The Kelly 107, and thus the conveyance means 110, may be suspended from the wellsite structure 108 via a hook 118 and swivel 120 in a manner permitting rotation of the Kelly 107 and the conveyor 110 relative to the hook 118. However, a top drive (not shown) may be utilized instead of or in addition to the Kelly 107 and rotary table 116 arrangement.

The wellsite system 100 also comprises a pit, tank, and/or other surface container 124 containing drilling fluid 122. A pump 126 delivers the drilling fluid 122 to the interior of the conveyor 110, such as via a fluid delivery conduit 127 extending between the pump 126 and the swivel 120, internal flow passages (not shown) of the swivel 120, and the interior of the Kelly 107, thus inducing the drilling fluid 122 to flow downhole through the conveyor 110, as indicated by directional arrow 128. The drilling fluid 122 exits ports (not shown) in the drill bit 114 and then circulates uphole through an annulus 103 defined between the outside of the conveyor 110 and the wall of the wellbore 102, as indicated by direction arrows 130. In this manner, the drilling fluid 122 lubricates the drill bit 114 and carries formation cuttings up to the surface, where the drilling fluid 122 is returned to the surface container 124 via a fluid return line 129 for recirculation.

Additional surface equipment 138 includes a controller and/or other processing system for controlling the BHA 112 and perhaps other portions of the well site system 100. The surface equipment 138 also includes interfaces for receiving commands from a human operator and communicating with the BHA 112 via mud-pulse telemetry. The surface equipment 138 also stores executable programs and/or instructions, including for implementing one or more aspects of the methods described herein.

The BHA 112 includes various numbers and/or types of downhole tools 132, 134, 136. One or more of the downhole tools 132, 134, 136 may be or comprise an acoustic tool, a density tool, a directional drilling tool, an electromagnetic (EM) tool, a sampling while drilling (SWD) tool, a formation testing tool, a formation sampling tool, a gravity tool, a monitoring tool, a nuclear tool, a photoelectric factor tool, a porosity tool, a reservoir characterization tool, a resistivity tool, a seismic tool, a surveying tool, and/or a tough logging condition (TLC) tool, although other downhole tools are also within the scope of the present disclosure. One or more of the downhole tools 132, 134, 136 may also be implemented as an MWD or logging-while-drilling (LWD) tool for the acquisition and/or transmission of downhole data to the surface equipment 138.

For example, the downhole tool 132 may be or comprise an MWD or LWD tool comprising a sensor package 140 operable for the acquisition of measurement data pertaining to the BHA 112, the wellbore 102, and/or the formation 130. The downhole tool 132 and/or another portion of the BHA 112 may also comprise a telemetry device 142 operable for communication with the surface equipment 138, such as via mud-pulse telemetry. The downhole tool 132 and/or another portion of the BHA 112 may also comprise a downhole control system 144 operable to receive, process, and/or store information received from the sensor package 140 and/or other portions of the BHA 112. The downhole control system 144 may be or comprise a controller and/or other processing system operable to control the sensor package 140, the telemetry device 142, and/or other portions of the BHA 112. The downhole control system 144 may also store executable programs and/or instructions.

Figure 2:
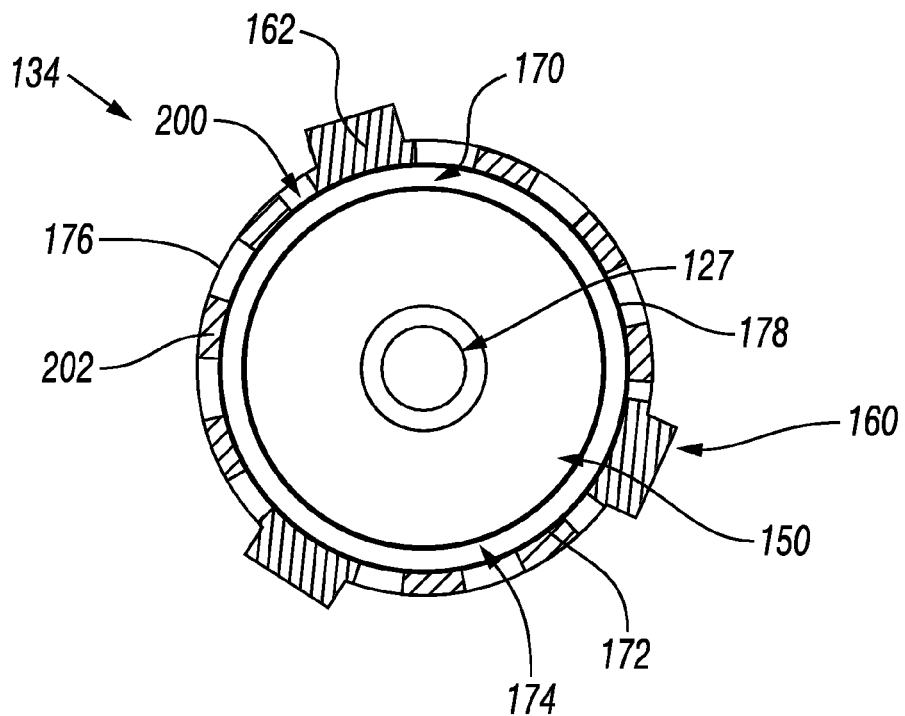
FIG. 2 is an azimuthal section view of a downhole tool according to an embodiment of the disclosure.

FIG. 2 shows at least a part of a downhole tool 134 of the wellsite system. A section of the tool is represented. It comprises a collar 150 in which is arranged the fluid delivery conduit 127 for receiving mud. The collar is also covered by a stabilizer comprising three blades 162 for centralizing the collar within the borehole. Between the collar and the stabilizer a particle detection assembly 170 is arranged. This particle detection assembly comprises a pressure housing 172 in which are arranged one or more detectors, here only one detector 174. The detector is wrapped around the entire circumference of the collar 150 in an azimuthal plane of the tool in order to form a ring around the collar.

In this embodiment the particle detector is configured to detect photons such as gamma ray or x-ray photons. It may be for instance gamma ray photons or x-ray photos emitted by the tool and scattered back from the formation or gamma ray photons generated by reactions between nuclei in the formation and neutrons when the formation is irradiated with neutrons for instance coming from the tool.

The downhole tool may therefore also comprise a neutron source or a gamma-ray source, not shown in FIG. 2. The neutron source may be a chemical source such as $^{241}$AmBe or $^{252}$Cf or a neutron generator, such as a pulsed neutron generator. The gamma ray or x-ray source may also be a chemical source, such a $^{137}$Cs, or an electronic generator. Any type of neutron or gamma ray or x-ray source known in the art is suitable for the tool according to the disclosure. The source may be mounted in a tool chassis situated inside of the collar and in particular inside of the fluid conduit 127, for instance axially offset from the detection assembly.

Figure 3:
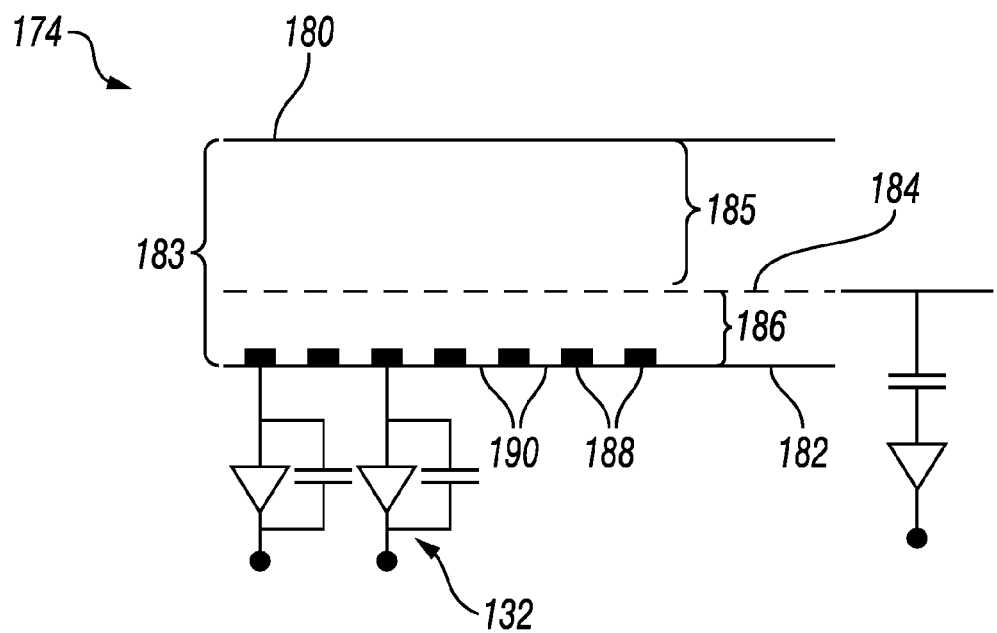
FIG. 3 is a schematic section view of a detector of the tool of FIG. 2.

The detector may be a flexible assembly of a micro-mesh gaseous detector, as will be described in reference to FIG. 3. It enables the detector to be bent in order to position it around the collar and to form at least part of a ring around the collar. With such a configuration the detector is close to the wellbore.

A micromesh gaseous detector 174 comprises a cathode 180, an anode 182 separated by a gap 183. A micro-mesh 184 is arranged between the cathode 180 and the anode 182, in the gap 183. The cathode 180, anode 182 and micromesh 184 are disposed essentially parallel to each other. The gap 183 is filled with a gas such as Argon or Xenon, or a mixture containing one of these gases for example. In this embodiment, the cathode 174 is disposed for facing an outer surface of the tool whereas the anode faces the collar.

The cathode 180 is set at a first voltage creating a first electrical field in a first portion of the gap 183 situated between the cathode and the micromesh while the micromesh 184 is set at a second high voltage creating a second electrical field in a second portion 186 of the gap between the micro mesh and the anode 182. The voltages of the cathode and the micromesh are chosen so that the first electric field is for instance around 400 V/cm while the second electric field is around 4 kV/cm. The anode 182 comprises strips or pixels 188 separated by voids 190, each strip being electrically connected to an electrical circuit 192.

When a photon enters the chamber via the cathode, it interacts with the gas inside or the wall of the detector creating ions that move towards the cathode and electrons that move towards the micromesh due to the first electric field. When the electrons enter the second electric field, they are accelerated by the second electric field and create an avalanche and a significant (amplified) signal on the anode 182. The charge movement (current) between the two electrodes creates an electrical signal enabling to detect the presence of an initial photon. The strips 188 of the anode 182 enable tracking the location of the photon interaction.

As shown in FIG. 2, the stabilizer has an outer surface 176 within the wellbore and an inner surface 178 in contact with the particle detector assembly. The stabilizer may comprise at least a window 200 made of a material transparent to the particles to be detected by the detection assembly 170. The window extends over an angular portion of the stabilizer in the azimuthal plane, partially or completely between the outer 176 and inner surface of the stabilizer. In other words, the window extends between the particle detection assembly and the outer surface of the tool. The window enables protecting the detector which will not be damaged by the drilling operation, for instance by the cuttings, even though it is located close to the formation.

The stabilizer may also comprise at least a particle shield 202 that absorbs the particles, extending as well over an angular portion of the stabilizer in the azimuthal plane, between the inner and outer surfaces of the stabilizer. In a variant (not shown), the shield may constitute only part of the radial thickness of the stabilizer.

The windows 200 and shields 202 may be arranged in an alternating pattern, i.e. two windows are separated by a shield and two shields are separated by a window in the azimuthal plane of the tool.

In this embodiment, each window may be made of a material transparent to gamma-ray or x-ray photons, such as PEEK (Poly Ether Ether Ketone) or PEKK (Poly Ether Ketone Ketone). The window may be covered, at the outer surface, with a layer of thin, corrosion resistant and impermeable material such as a material containing nickel to protect it from being damaged by the interaction with the wellbore fluid.

The shield may be made of a layer having a high density and a high atomic number Z, such as tungsten carbide, or alloys containing tungsten.

Such a tool makes it possible to have accurate particle detection at different angular positions relative to the axis of the tool, i.e. in the azimuthal plane of the tool, as the detection assembly covers the whole circumference of the tool and has a good spatial resolution, therefore being able to show heterogeneities in the formation around the borehole. The alternating pattern of shield and window enables to better differentiate the origin of the photons and to enhance the azimuthal resolution of the image. Since the detectors cover the entire circumference of the tool, images maybe obtained independently of whether the tool is rotating or sliding.

Figure 4:
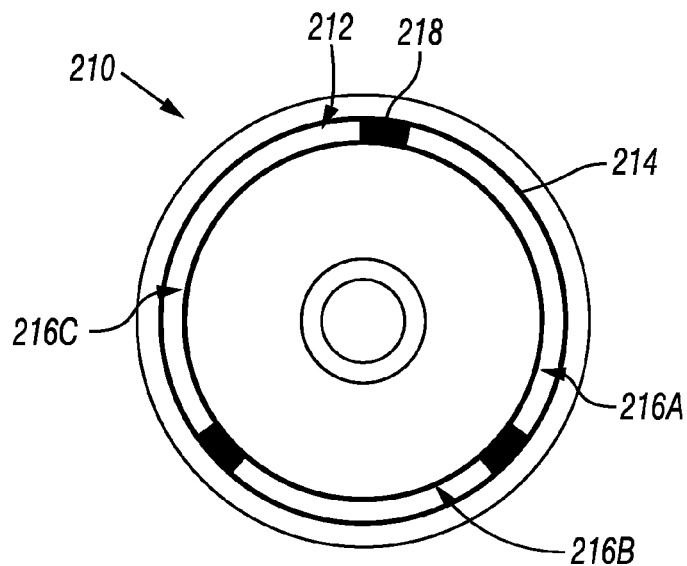
FIG. 4 is an azimuthal section view of a downhole tool according to another embodiment of the disclosure.

A downhole tool 210 according to another embodiment of the disclosure may have a different architecture. As shown on FIG. 4 the particle detection assembly may comprise a pressure housing 214 in which are arranged three detectors 216A, 216B, 216C, each separated by a holder 218. Each of the detectors is then wrapped around only an angular portion of the circumference of the collar in the azimuthal plane so that the detecting portions 216A, 216B, 216C of the tool are separated by non-detecting portions 218.

The particle detection assembly may also be covered by a protective cover forming a window over the particle detection assembly all around the tool. Indeed, the window may not be situated in the stabilizer and the tool may not comprise any shield.

In any of the embodiments described hereinabove, the window may have a radial thickness that is less than 5 centimeters.

Another alternative architecture may comprise a particle detection assembly having several pressure housings containing each only one detector and arranged on the tool so that the particle detection assembly substantially forms a ring around the tool even though every radial portion of the tool does not feature a detector.

Applicants consider that a ring is formed by a particle detection assembly when at least a total angular portion of 180° of the tool is covered by a detector (i.e. the sum of the angles of the detecting portions is superior to 180°), two detectors being separated by a non-detecting radial portion of no more than 60°.

Figure 5:
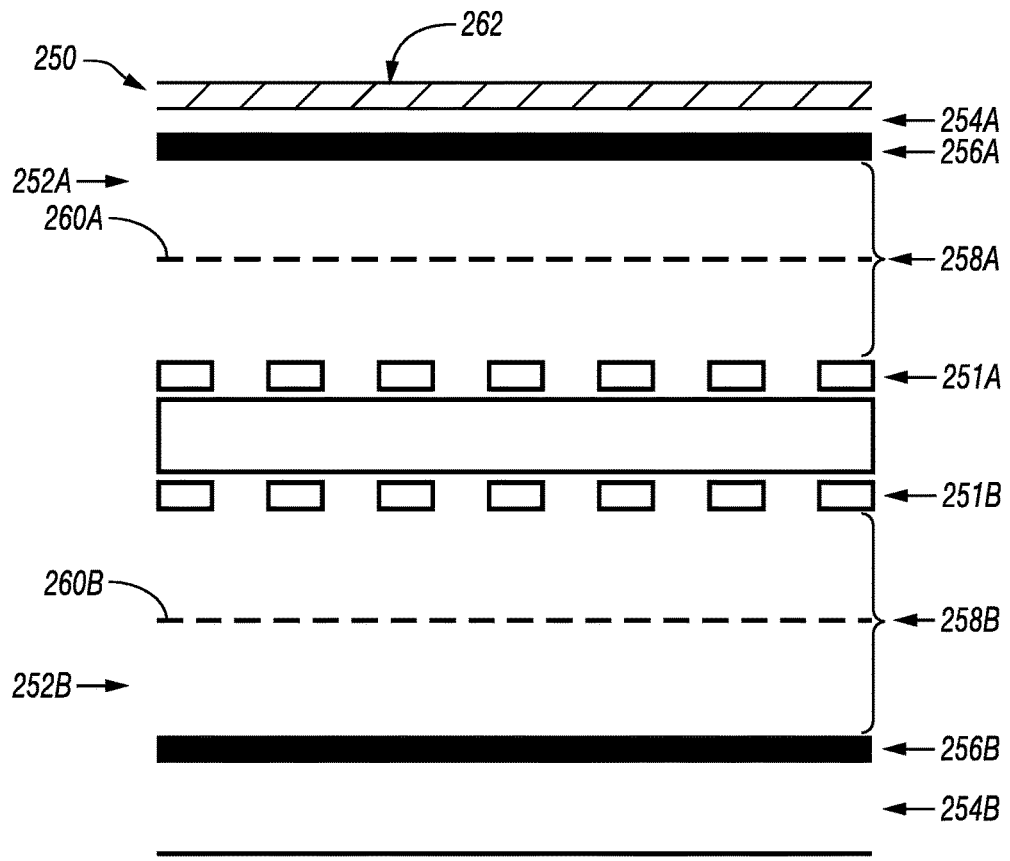
FIG. 5 is a schematic section view of a particle detection assembly.

In another embodiment of the tool shown in FIG. 5, the particle detection assembly 250 is intended to detect neutrons and not photons.

In this embodiment, the particle detection 250 assembly comprises two detectors 252A, 252B superimposed or stacked in the radial direction of the tool. More particularly, these detectors are stacked according to a symmetrical configuration, meaning that two electrodes of the same type are adjacent. The anodes 251A, 251B of the detectors are more particularly adjacent. It will be noted that the particle detection assembly may also comprise stacked detectors in a non-symmetrical configuration, i.e. the anodes of two adjacent detectors are separated by a cathode. Such as configuration is not limited to neutron detection even if disclosed in relationship with the detection of this type of particles. A photon detection assembly may have also stacked detectors in a symmetrical configuration or not.

The cathodes 254A, 254B of the detectors 252A, 252B are coated at least on their side facing the gap of the corresponding detector, with a neutron converting layer 256A, 256B, such as a layer of Boron 10 ($^{10}$B) or of boron-10carbide ($^{10}$B$_4$C). Such a layer indeed enables to generate a reaction between boron-10 ($^{10}$B(n, alpha)$^7$Li) and a neutron, capturing the neutron and generating charged particles such as alpha particles or $^7$Li nuclei or gamma-ray photons that may be detected by the particle detectors as explained beforehand. The thickness of the layer is optimized so that the reaction occurs and the charged particles have a high probability of exiting the layer and entering the gap between the anode and cathode, for instance a thickness of less than 10 microns. This design is particularly suited for the detection of thermal neutrons.

In a variant, the neutron-converting layer may not be a coating deposited on the cathode but may be disposed on the cathode by any convenient means. It may contain any known suitable material with significant cross section for neutron reactions such as gadolinium, or lithium, such as lithium enriched in $^6$Li. Such a neutron converting layer may also be disposed alternatively or additionally on the anode (on the face of the anode facing the gap) and/or on one of both faces of the grid 260A, 260B. A neutron detector may also comprise alternatively or additionally a gaseous neutron converting material filling the gap 258A, 258B of the detector, such as a gas containing Helium 3.

In another variant, the particle detection may comprise one detector (anode) only disposed between two cathodes (one anode replacing anodes 251A, 251B) and detecting the particles coming from each of the gaps, respectively defined by the anode and each of the cathodes.

Stacking the detectors and/or increasing the number of the neutron converting layers may enhance detection of neutrons, as neutrons may traverse a neutron converting layer without interacting in it.

The particle detection assembly may as well comprise at least a detector for detection of epithermal neutrons. Such detector may comprise a layer of a thermal neutron absorbing material 262, such as Cadmium. This layer may be deposited on the outer face of the cathode of the detector, as shown on FIG. 5, or may be a foil wrapped around the detector assembly. Such a layer enables the absorption of the thermal neutrons so that only epithermal neutrons are detected through their interaction with the boron layer. In a variant, the neutron absorption layer may also be located between the cathode and the neutron converting layer. The grid or anode may also be provided with such a neutron absorbing layer when they comprise a neutron converting layer. The neutron absorbing layer may be disposed so that particles reach the neutron absorbing layer before the neutron converting layer when coming from the outer surface of the tool. It may be disposed so that the charged particles generated in the neutron converting material reach the gap without passing in the neutron absorbing material (as the life duration of these particles is very short).

The particle detection assembly may as well comprise at least a detector for detection of fast neutrons. In this case, the neutron-converting material (layer and/or gas filling the gap) may contain hydrogen, which will enable a reaction generating recoil protons detected by the anode. If the neutron-converting material is a layer situated on the cathode, its thickness may be between 0.05 and 0.5 mm thick. It may also be coated on the side facing the gap by a thin electrically conductive layer.

Please note the configuration shown in FIG. 5 is exemplary and that the configuration of neutron detection assembly is not limited to this example. An epithermal or thermal neutron detection assembly may for instance be disposed on the tool without being stacked.

When the neutron source is a pulsed neutron generator emitting neutrons at known time bursts, such an epithermal neutron detector may also be used to obtain images of the slowing down time of the neutrons in the formation and borehole, as the detector has good spatial and time resolution.

When the particle detector is a neutron detector, the tool may also comprise a window made of a material transparent to neutrons, such as zirconium $^{90}$Zr, and in particular a neutron moderator made of a hydrogenous material such as PEEK or PEKK as disclosed in the gamma-ray application. The latter leads to additional thermalization of neutrons and enhances the detection probability, It may also comprise at least a shield, and for instance an alternating pattern of window and shield as shown in FIG. 2. However, in this embodiment, the shield may comprise a layer of neutron absorbing material such as a layer comprising boron. It may also comprise a layer of neutron moderating material covering the outer surface of the layer of neutron absorbing material.

Figure 6:
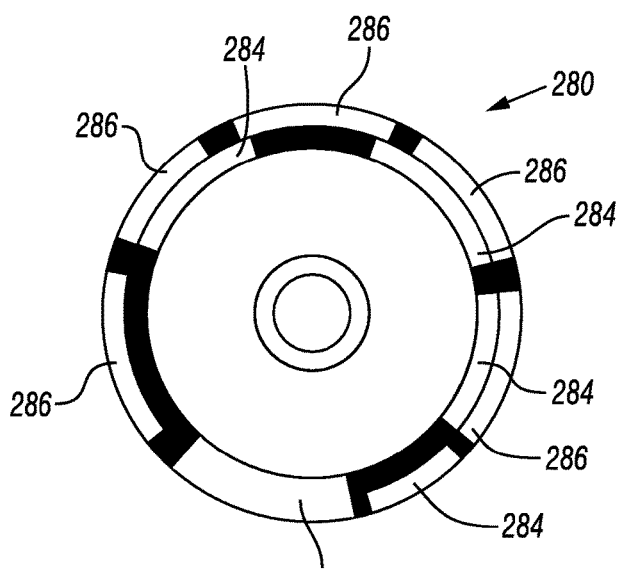
FIG. 6 is an azimuthal section view of a downhole tool according to another embodiment of the disclosure.

Another exemplary configuration of the tool is shown on FIG. 6. In this configuration, the tool 280 comprises a particle detection assembly 282 including a plurality of pressure housings 284, 286, 288 containing one or several detectors. For instance, pressure housing 284 may comprise a detector for detecting a first type of particle (e.g. x-ray photon, gamma-ray photon, thermal or epithermal neutron), pressure housings 286 comprise a detector for detecting a second type of particle and pressure housing 288 comprises two stacked detectors such as the one shown in FIG. 5, for instance a stack of a detector for detecting the first and second type of particles. The particle detection assembly therefore includes two stacked layers of detectors wrapped around the tool. It will also be noted that for the first type of particle, some of the detectors are provided on the outer layer and some other are provided on the inner layer of the particle detection assembly, i.e. detectors are offset from each other in the radial direction. Such a configuration still enables to obtain an azimuthal image of the wellbore. The detector of the inner layer and of the outer layer do not need to be exactly superimposed and may be azimuthally offset, as shown on FIG. 5.

Here, the outer surface of the pressure housings 284, 286, 288 of the outer layer of the particle detection assembly forms part of the outer surface of the tool. The window is then formed in the pressure housing itself. It has also to be noted that the particle may reach the inner layer of the tool going through the outer layer of the particle detection assembly, if it had not been captured in the detector of the outer layer.

In a variant of this embodiment, the detectors of all the pressure housings 284, 286, 288 may be chosen to detect the same type of particles. The tool may also comprise more than two stacked detectors in the radial direction of the tool. Any window and/or shield configuration is compatible with a stacked configuration of the detectors of the particle detection assembly.

Through the use of stacked detectors, it is also possible to detect any types of particles at the same azimuthal and axial location. For instance, in the radial stack some of the detectors could be photon detectors and others neutron detectors.

As shown in the embodiment above, the detector wrapped around the tool, be it piecewise or over the complete circumference, could have alternating segments of detectors being sensitive to one or another kind of particle at the same axial position, i.e. in the same azimuthal plane, meaning that the active areas of the detectors overlap axially.

Figure 7:
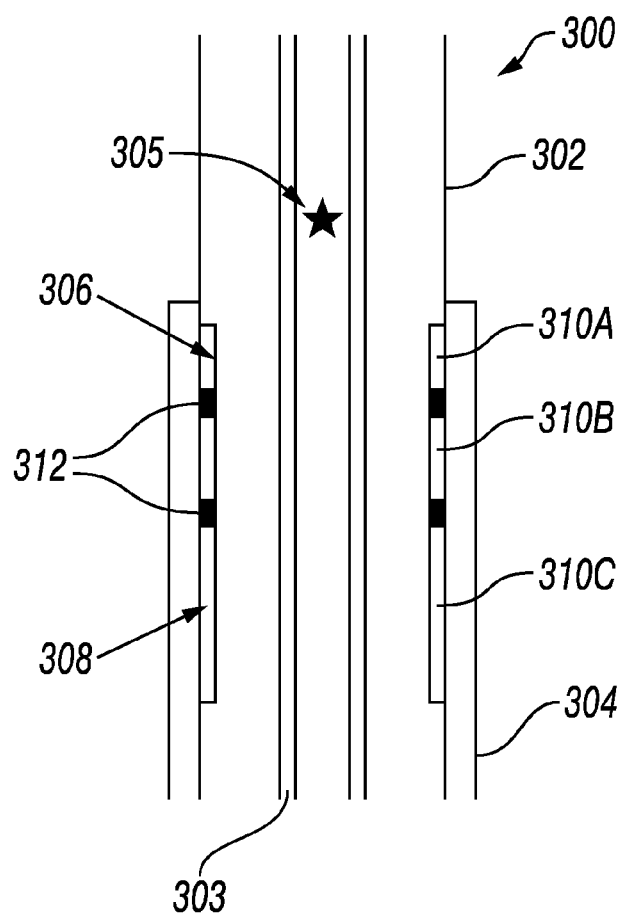
FIG. 7 is a longitudinal section view of a downhole tool according to an embodiment of the disclosure.

FIG. 7 shows an axial section of a downhole tool according to an embodiment of the disclosure. This downhole tool comprises as disclosed in relation with FIG. 2, a collar 302 in which is arranged a fluid conduit 303 and a stabilizer 304 covering the collar 302. The collar comprises a source 305, such as a neutron source, arranged in the tool inside of the fluid conduit 303 and a peripheral recess 306 in which is disposed a pressure housing 308. The pressure housing may comprise a first type of detection assembly 310A situated at a first axial (or longitudinal) distance from the source, such as a thermal neutron detector, a second type of detection assembly 310B, situated at a second axial distance from the source, such as an epithermal neutron detector and a third type of detection assembly situated at a third axial distance of the source, such as a gamma ray detector for detecting gamma rays generated in the formation when neutrons are emitted by the source. The detectors 310A, 310B and 310C may be separated axially by holders 312.

Any other configuration of tool may also be part of the disclosure. For instance, the tool may comprise a shield interposed between the source and the detectors. The source may also be a gamma-ray source and/or x-ray source instead of a neutron source or the tool may comprise a gamma ray source in addition to a neutron source. It may be positioned in the tool at other locations, for instance below the detection assemblies or outside of the fluid conduit 303.

The tool may also comprise any number of detectors of same or different type. Another type of detector may be an x-ray detector. The detection assemblies may be disposed in different pressure housings and/or in different recesses of the collar. They may not be covered by the stabilizer.

In one embodiment the detectors may be placed inside the drill collar and mounted on the tool chassis surrounding the mud channel. Windows may be provided in the drill collar to facilitate the transmission of the particles (gamma ray photons or neutrons) to the detectors.

The tool that has been described here is an LWD tool used during the drilling of a well. However, the tool according to the disclosure may also be another type of tool, such as a wireline tool, a slickline tool, a through-pipe conveyed tool for instance.

In a wireline, slickline etc. tool, the detectors may be mounted inside the tool's pressure housing, not necessitating a pressure housing of their own. Alternatively, they can be mounted and wrapped around the tool pressure housing in their own pressure housing, in which case they may be covered by a protective sleeve.

Figure 8:
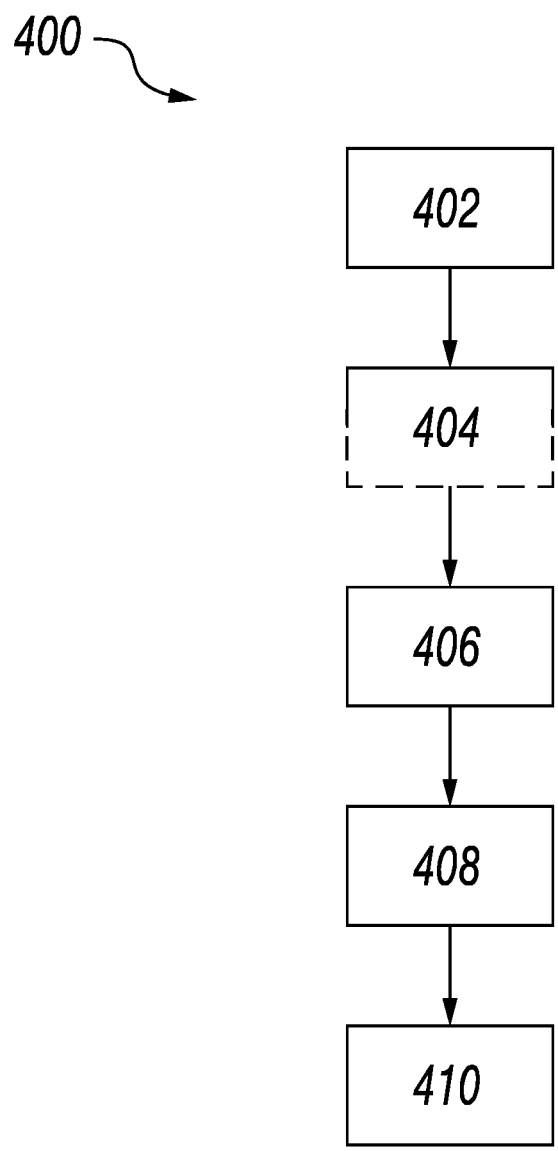
FIG. 8 is a flow chart of a method according to one or more embodiments of the disclosure.

The disclosure also relates to a method 400 for obtaining an azimuthal image of a borehole, i.e. an image of the borehole in an azimuthal plane as shown in FIG. 8. The method includes conveying a downhole tool according to the disclosure into the wellbore (box 402). It may optionally also include emitting neutrons or gamma-rays or x-rays into the formation with a source situated in the tool (box 404) and detecting via the one or more particle detection assemblies of the tool at least one particle type (obtained here following the emission) by receiving electrical detection signals coming from the particle detection assembly, in particular from each pixel of the detector as explained beforehand (box 406). Particles detected by the detector may be of the same type as the emitted particles at box 404 or a different particle type: for instance the source may emit neutrons, while the particle detection assembly detects gamma-ray photons. The detection signals associated with a time and an azimuthal position are then processed with other data, such as data relative to the orientation and depth of the tool obtained from different sensors, in the tool or at the surface, so as to obtain a radial image of the borehole (box 410). The radial image of the borehole may be an image of a particle count all around the borehole or an image of a property of the wellbore (such as the formation or the casing for instance) derived from the particle count.

Examples of such properties are neutron gamma density (derived for instance from a neutron induced gamma-ray photon count), or neutron porosity (from the detection of neutrons or gamma rays), slowing down time of the neutrons in the formation, casing thickness or cement detection, borehole caliper, (derived for instance from the neutron count), etc. The imaging of some of the above-mentioned properties may necessitate to include in the tool more than one particle detection assembly of a predetermined type, for instance two particle detection assemblies situated at different axial spacing from the source. The arrangement of particle detection assemblies for obtaining each property is known from the one of ordinary skill.

The processing of the obtained electrical signal may be performed directly by the processor situated in the tool or at the surface, the data coming from the tool being retrieved from its storage when the tool is at the surface or sent via mud-pulse telemetry to the surface in the case of an LWD/MWD tool. In wireline, data may be sent to the surface through the wireline.

In view of the entirety of the present disclosure, including the figures, a person skilled in the art should appreciate that they may readily use the present disclosure as a basis for designing or modifying other processes and structures for carrying out the same uses and/or achieving the same aspects introduced herein. A person skilled in the art should also realize that such equivalent constructions do not depart from the spirit and scope of the present disclosure, and that they may make various changes, substitutions and alterations herein without departing from the spirit and scope of the present disclosure. For example, although the preceding description has been described herein with reference to particular means, materials and embodiments, it is not intended to be limited to the particulars disclosed herein; rather, it extends to functionally equivalent structures, methods, and uses, such as are within the scope of the appended claims.

The disclosure indeed also relates to a downhole tool to be lowered into a wellbore, having a longitudinal axis and an outer surface, the tool including a particle detection assembly having at least one particle detector for detecting at least a predetermined type of particles, wherein the particle detectors of the assembly are each wrapped around at least one detecting portion forming an angular portion of the tool azimuthal plane perpendicular to the longitudinal axis of the tool so that the detection assembly substantially forms a ring, and at least a window transparent to the particle type and extending between the outer surface and the particle detection assembly.

Such tool may comprise one or several of the below features alone or in combination.

The downhole tool may comprise a drill collar and a stabilizer arranged around the collar, wherein the particle detection assembly substantially forms a ring around the collar, the at least one window being formed in the stabilizer.

The sum of the azimuthal angles of the detecting portions of the particle detection assembly may be greater than 180°, the particle detection assembly being arranged so that a non-detecting angular portion of the tool between two adjacent detecting portions may have an azimuthal angle that does not exceed 60°. In a particular embodiment, the particle detection assembly comprises one detecting portion having an azimuthal angle greater than 300°.

The tool may also comprise at least a shield for the particle type extending between the outer surface of the tool and the particle detection assembly. The shield may be formed in the stabilizer in a particular configuration of the tool, such as when the window is formed in the stabilizer.

In particular, alternating windows and shields may be arranged at least on an angular portion of the tool in the azimuthal plane.

The particle detection assembly may comprise a pressure housing encapsulating at least one of the detectors. In a particular embodiment, the outer surface of the tool comprises an outer surface of the pressure housing, the window being formed in the pressure housing.

The detector may comprise a flexible assembly bent around the tool, i.e. in at least part of the detecting portion of the tool.

The particle detection assembly may comprise a plurality of detectors stacked in a radial direction of the tool, in the azimuthal plane, i.e. at different distances from the center of the tool.

Each of the particle detectors may be a micro-mesh gaseous detector.

The detector may comprise a cathode facing the outer surface of the tool and an anode facing the inside of the tool.

At least two of the stacked detectors may have a symmetrical configuration. In particular the anode of a first detector of the stack may be adjacent to the anode of a second detector of the stack. Alternatively, two cathodes may also be associated with one anode so that the anode is positioned between the cathodes.

The detector may comprise a neutron-converting material. In a configuration, the neutron-converting material may comprise a layer disposed on at least one of the cathode, the anode and a grid disposed in a gap between the cathode and the anode. In this case, the layer may be disposed on a face of one of the cathode or anode facing the other of the anode or cathode. The thickness of the layer may be lesser than 10 microns. It may include Boron and more particularly Boron 10, Gadolinium, Lithium and more particularly Lithium 6 or a combination thereof. The layer may be a coating deposited on the cathode, anode or grid or a foil. Alternately or additionally, the neutron-converting material may comprise a gas filling the gap between the cathode and the anode, such as Helium 3.

The particle detector may also comprise a layer of neutron absorbing material interposed between the outer surface and the neutron-converting material. For instance, the neutron absorbing material may be disposed between the outer surface and the cathode, the neutron-converting material being on the other side of the cathode or between the cathode and the neutron-converting material, on the same side of the cathode as the neutron-converting material. The neutron-absorbing layer may be a coating deposited on the cathode for instance or a foil wrapped around it.

The tool may comprise a first particle detection assembly for detecting a first predetermined type of particle, and a second particle detection assembly for detecting a second predetermined type of particle. The first and second particle assembly may be situated at the same axial position, i.e. in the same azimuthal plane. They may for instance be stacked on each other and/or comprise interleaved detectors, i.e. a detector of the first assembly being positioned in a non-detecting zone of the second assembly.

The particle type detected by the detection assembly may be a gamma-ray photon, an x-ray photon, a thermal neutron, an epithermal neutron or a fast neutron.

The tool may also comprise a neutron source, an x-ray source or a gamma-ray source. Such source may be positioned inside of the collar and axially offset relative to the particle detection assembly.

At least one window may be made at least in part of PEEK, PEKK, Titanium or Zirconium. The window may be made at least in part of a neutron moderator, in particular when the window is associated with a neutron detection assembly and/or a material having a low density and a low atomic number Z, i.e. a low number of protons in the nucleus, in particular, when the window is associated with a gamma-ray or x-ray photon detection assembly.

At least one shield may be made at least in part of a material having a high density and a high Z, i.e. high atomic number of the nucleus, such as a material containing tungsten, in particular when the shielding is associated with a photon detection assembly or a neutron absorbing material, such as a material containing Boron-10 ($^{10}B$), in particular when the shielding is associated with a neutron detection assembly. In the latter case, the neutron absorbing material may be covered with a neutron moderator to enhance the efficiency of the neutron absorption.

The downhole tool may be any type of tool, such as a LWD tool, a wireline tool, etc.

The disclosure also relates to a method for imaging at least a parameter relative to a wellbore comprising:
  a. Conveying a downhole tool according to any of the preceding claims in the wellbore,
  b. Receiving detection signals representative of a detection of a predetermined type of particles from the particle detection assembly,
  c. Processing the detection signals in order to obtain an azimuthal image of at least a parameter relative to the wellbore.

A parameter relative to the wellbore may be a parameter relative to the formation or to the borehole, such as the casing. Examples of such properties may be a particle count, a slowing down time, a porosity or a density of the formation, a thickness of the casing, a cement detection, a borehole caliper, etc.

An azimuthal image is an image in the azimuthal plane, i.e. at a plurality of angular positions relative to the axis of the tool in the azimuthal plane.

The method may also comprise emitting particles with a source situated in the tool, the detection following the emission, the emitted particles being of the predetermined type of particles or of a different type, for instance the emitted particles may be neutrons while the detected particles are gamma-ray photons.

Processing the detection signals may comprises using other data relative to the tool such as depth and orientation of the tool to obtain the azimuthal image, for instance by correlation a detected signal with a position and a time.

The invention claimed is:

1. A downhole tool to be lowered into a wellbore, having a longitudinal axis and an outer surface, the tool including:
  a particle detection assembly having at least one particle detector for detecting at least a predetermined type of particles, wherein the particle detectors of the assembly are each wrapped around at least one detecting portion forming an angular portion of the tool's azimuthal plane perpendicular to the longitudinal axis of the tool so that the detection assembly substantially forms a ring,
  at least a window transparent to the particle type and extending between the outer surface and the particle detection assembly, wherein each of the particle detectors is a micro-mesh gaseous detector.

2. The downhole tool according to claim 1, wherein the detector comprises a neutron-converting material.

3. The downhole tool according to claim 2, wherein the tool comprises a drill collar and a stabilizer arranged around the collar, wherein the particle detection assembly substantially forms a ring around the collar, the at least one window being formed in the stabilizer.

4. The downhole tool according to claim 2, wherein the sum of the azimuthal angles of the detecting portions of the particle detection assembly is greater than 180°, the particle detection assembly being arranged so that a non-detecting angular portion of the tool between two adjacent detecting portions has an azimuthal angle that does not exceed 60°.

5. The downhole tool according to claim 4, wherein the particle detection assembly comprises one detecting portion having an azimuthal angle greater than 300°.

6. The downhole tool according to claim 2, wherein the tool comprises at least a shield for the particle type extending between the outer surface of the tool and the particle detection assembly.

7. The downhole tool according to claim 6, wherein alternating windows and shields are arranged at least on an angular portion of the tool in the azimuthal plane.

8. The downhole tool according to claim 2, wherein the particle detection assembly comprises a pressure housing encapsulating at least one of the detectors.

9. The downhole tool according to claim 8, wherein the outer surface of the tool comprises an outer surface of the pressure housing and wherein the window is formed in the pressure housing.

10. The downhole tool, according to claim 2, wherein the particle detector comprises a layer of neutron absorbing material interposed between the outer surface and the neutron-converting material.

11. The downhole tool according to claim 2, wherein the tool comprises:

A first particle detection assembly for detecting a first predetermined type of particle, A second particle detection assembly for detecting a second predetermined type of particle.

12. The downhole tool according to claim 2, wherein the particle type detected by the detection assembly is a gamma-ray photon, an x-ray photon, a thermal neutron, an epithermal neutron or a fast neutron.

13. A method for imaging at least a parameter relative to a wellbore comprising:

Conveying a downhole tool according to claim 2 in the wellbore,

Receiving detection signals representative of a detection of a predetermined type of particles from the particle detection assembly, Processing the detection signals in order to obtain an azimuthal image of at least a parameter relative to the wellbore.

14. A downhole tool to be lowered into a wellbore, having a longitudinal axis and an outer surface, the tool including:

a particle detection assembly having at least one particle detector for detecting at least a predetermined type of particles, wherein the particle detectors of the assembly are each wrapped around at least one detecting portion forming an angular portion of the tool's azimuthal plane perpendicular to the longitudinal axis of the tool so that the detection assembly substantially forms a ring, at least a window transparent to the particle type and extending between the outer surface and the particle detection assembly, wherein the particle detection assembly comprises a plurality of detectors stacked in a radial direction of the tool.

* * * * *